(12) United States Patent
Hamada (10) Patent No.: US 8,281,130 B2
(45) Date of Patent: Oct. 2, 2012

(54) AUTHENTICATION SYSTEM AND AUTHENTICATION OBJECT DEVICE

(75) Inventor: Koji Hamada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1120 days.

(21) Appl. No.: 12/095,189

(22) PCT Filed: Oct. 4, 2006

(86) PCT No.: PCT/JP2006/319856
§ 371 (c)(1),
(2), (4) Date: Jul. 8, 2008

(87) PCT Pub. No.: WO2007/072615
PCT Pub. Date: Jun. 28, 2007

(65) Prior Publication Data
US 2008/0301455 A1    Dec. 4, 2008

(30) Foreign Application Priority Data
Dec. 19, 2005    (JP) .................................. 2005-365622

(51) Int. Cl.
*H04L 29/06* (2006.01)
(52) U.S. Cl. ........................................ 713/168; 713/150
(58) Field of Classification Search .................. 713/168, 713/150
See application file for complete search history.

(56) References Cited

U.S. PATENT DOCUMENTS

| | | | |
|---|---|---|---|
| 5,491,749 A * | 2/1996 | Rogaway ..................... | 713/171 |
| 5,592,553 A * | 1/1997 | Guski et al. ................. | 713/159 |
| 6,028,937 A * | 2/2000 | Tatebayashi et al. ......... | 713/169 |
| 6,647,493 B1 * | 11/2003 | Occhipinti et al. ........... | 713/170 |
| 7,412,600 B2 * | 8/2008 | Wong et al. .................. | 713/160 |
| 2001/0014155 A1 * | 8/2001 | Sugahara et al. ............. | 380/277 |

(Continued)

FOREIGN PATENT DOCUMENTS

| | | |
|---|---|---|
| JP | 11163853 | 6/1999 |
| TW | 518871 | 1/2003 |
| WO | 0045358 | 8/2000 |

OTHER PUBLICATIONS

International Preliminary Report on Patentability and Written Opinion of the International Searching Authority dated Jul. 3, 2008, for corresponding International Patent Application PCT/JP2006/319856.

(Continued)

*Primary Examiner* — Edan Orgad
*Assistant Examiner* — Bradley Holder
(74) *Attorney, Agent, or Firm* — Katten Muchin Rosenman LLP (57) ABSTRACT

To provide an authentication system for improving security, using fewer encryption keys. An authentication requesting device (20) and an authentication target device (10) hold common encryption keys. The authentication requesting device (20) encrypts an authentication code, then selects mutually different portions in the authentication code as switching target portions, and sends an encrypted authentication code and information about the switching target portions to the authentication target device (10). The authentication target device (10) switches the switching target portions in a code obtained by decrypting the received code, to thereby produce a switched authentication code, then encrypts the switched authentication code, and sends to the authentication requesting device (20). The authentication requesting device (20) compares the switched authentication code obtained by decrypting the code received with a code obtained by switching the switching target portions of the authentication code to carry out an authentication process for the authentication target device (10).

3 Claims, 5 Drawing Sheets

U.S. PATENT DOCUMENTS

| | | | |
|---|---|---|---|
| 2002/0046183 A1* | 4/2002 | Gilham | 705/60 |
| 2002/0078344 A1* | 6/2002 | Sandhu et al. | 713/155 |
| 2002/0078345 A1* | 6/2002 | Sandhu et al. | 713/155 |
| 2002/0078346 A1* | 6/2002 | Sandhu et al. | 713/156 |
| 2002/0114450 A1* | 8/2002 | Rose | 380/28 |
| 2003/0065952 A1 | 4/2003 | Otsuka | |
| 2003/0159041 A1* | 8/2003 | Yokota et al. | 713/168 |
| 2003/0191949 A1 | 10/2003 | Odagawa | |
| 2004/0083177 A1* | 4/2004 | Chen et al. | 705/50 |
| 2005/0232427 A1* | 10/2005 | Konersmann | 380/277 |
| 2006/0148402 A1* | 7/2006 | Hagiwara | 455/41.1 |
| 2007/0101129 A1* | 5/2007 | Wong et al. | 713/160 |

OTHER PUBLICATIONS

Partial translation of Taiwanese Search Report dated Oct. 6, 2010.

Eugenio Oliveira, et al. "Reliable Framework Architecture for Multi-Agents Systems Interaction" The 7th International Conference on Computer Supported Cooperative Work in Design, 2002, pp. 276-281.

International Search Report dated Dec. 19, 2006 from corresponding PCT/JP06/319856.

* cited by examiner

AUTHENTICATION SYSTEM AND AUTHENTICATION OBJECT DEVICE

TECHNICAL FIELD

The present invention relates to an authentication system and an authentication target device included therein, in which a common encryption key is used by the authentication target device and an authentication requesting device for carrying out an authentication process with respect to the authentication target device, when carrying out an authentication process.

BACKGROUND ART

In recent years, various electric home appliances, including consumer game machines, have highly sophisticated functions, and many appliances are adapted to expansion of the function thereof by connecting a peripheral device to the main bodies thereof. For such a product, it may be desirable to determine whether or not a peripheral device is an authentic product (a genuine product), in order to avoid any expected trouble which could be caused by the user by connecting by mistake a product of a different brand to the main body.

In view of the above, there is an idea in which an authentication process generally used for computers is carried out between the main body of an electric home appliance and a peripheral device to determine whether or not the peripheral device is an authentic product. For example, Patent Document 1 discloses an example of an authentication process of a typical challenge-response type. As an example algorithm for realizing such an authentication process, there is available a common key encryption algorithm according to which both of an authentication requesting device, such as the main body of an electric home appliance and so forth, which requests authentication and an authentication target device, such as a peripheral device, to be a target of an authentication process possess a common encryption key (a common key).

Patent Document 1: Japanese Patent Laid-open Publication No. Hei 11-163853

DISCLOSURE OF THE INVENTION

Problems to be Solved by the Invention

According to the above-described conventional technique, data subjected to encryption using a specific encryption key is exchanged between the authentication requesting device and the authentication target device every time an authentication process is carried out. However, multiple interceptions of data encrypted using the same encryption key may increase the risk that the encrypted data will be decrypted, and thus increase the risk of leakage of the encryption key to a third party.

In order to reduce such a risk, there is available a method according to which multiple encryption keys are prepared so that a different encryption key is used for every authentication process. However, a peripheral device or the like may have only a memory of limited capacity due to hardware restrictions and thus may not able to hold so many encryption keys, for example.

The present invention has been conceived in view of the above, and one of the objects thereof is to provide an authentication system and an authentication target device included therein for improving the security, using fewer encryption keys, when an authentication process is carried out according to a common key encrypting algorithm.

Means for Solving the Problems

In order to achieve the above-described object, according to one aspect of the present invention, there is provided an authentication system having an authentication target device and an authentication requesting device for carrying out an authentication process for the authentication target device, in which the authentication target device and the authentication requesting device respectively hold at least one common encryption key, wherein the authentication requesting device comprises first encrypted code production means for encrypting an authentication code, using the encryption key, to thereby produce a first encrypted code; switching target portion selecting means for selecting at least one pair of mutually different portions in the authentication code as switching target portions; transmission means for sending the first encrypted code and switching target portion specifying information which specifies the switching target portions to the authentication target device; and switching means for switching the switching target portions of the authentication code, to thereby produce a comparing code, and the authentication target device comprises authentication code decrypting means for decrypting the first encrypted code sent, using the encryption key, to thereby restore the authentication code; switching means for switching the switching target portions of the authentication code restored, based on the switching target portion specifying information sent, to thereby produce a switched authentication code; second encrypted code production means for encrypting the switched authentication code, using the encryption key, to thereby produce a second encrypted code; and transmission means for sending the second encrypted code to the authentication requesting device, and the authentication requesting device decrypts the second encrypted code sent, using the encryption key, to thereby restore the switched authentication code, and compares with the comparing code to carry out an authentication process for the authentication target device.

According to another aspect of the present invention, there is provided an authentication target device holding at least one encryption key common to an encryption key held by the authentication requesting device, to be a target of an authentication process carried out by the authentication requesting device, comprising: first encrypted code receiving means for receiving a first encrypted code obtained by encrypting an authentication code, using the encryption key, from the authentication requesting device; switching target portion receiving means for receiving switching target portion specifying information specifying at least one pair of mutually different portions in the authentication code as switching target portions, from the authentication requesting device; authentication code decrypting means for decrypting the first encrypted code received, using the encryption key, to thereby restore the authentication code; switching means for switching the switching target portions in the authentication code restored, based on the switching target portion specifying information received, to thereby produce a switched authentication code; second encrypted code producing means for encrypting the switched authentication code, using the encryption key, to thereby produce a second encrypted code; and second encrypted code transmission means for sending the second encrypted code to the authentication requesting device, wherein the second encrypted code is used in an authentication process to be carried out by the authentication requesting device.

According to still another aspect of the present invention, there is provided an authentication target device holding at least one encryption key common to an encryption key held by the authentication requesting device, to be a target of an authentication process carried out by the authentication requesting device, comprising: switching target portion receiving means for receiving switching target portion specifying information specifying at least one pair of mutually different portions in the encryption key as switching target portions, from the authentication requesting device; first encrypted code receiving means for receiving a first encrypted code obtained by encrypting an authentication code, using the encryption key obtained by switching the switching target portions of the encryption key, from the authentication requesting device; switching means for switching the switching target portions in the encryption key, based on the switching target portion specifying information received, to thereby produce a switched encryption key; authentication code decrypting means for decrypting the first encrypted code received, using the switched encryption key, to thereby restore the authentication code; second encrypted code producing means for encrypting the authentication code restored, to thereby produce a second encrypted code; and second encrypted code transmission means for sending the second encrypted code to the authentication requesting device wherein the second encrypted code is used in an authentication process to be carried out by the authentication requesting device.

BEST MODE FOR CARRYING OUT THE INVENTION

Figure 1:
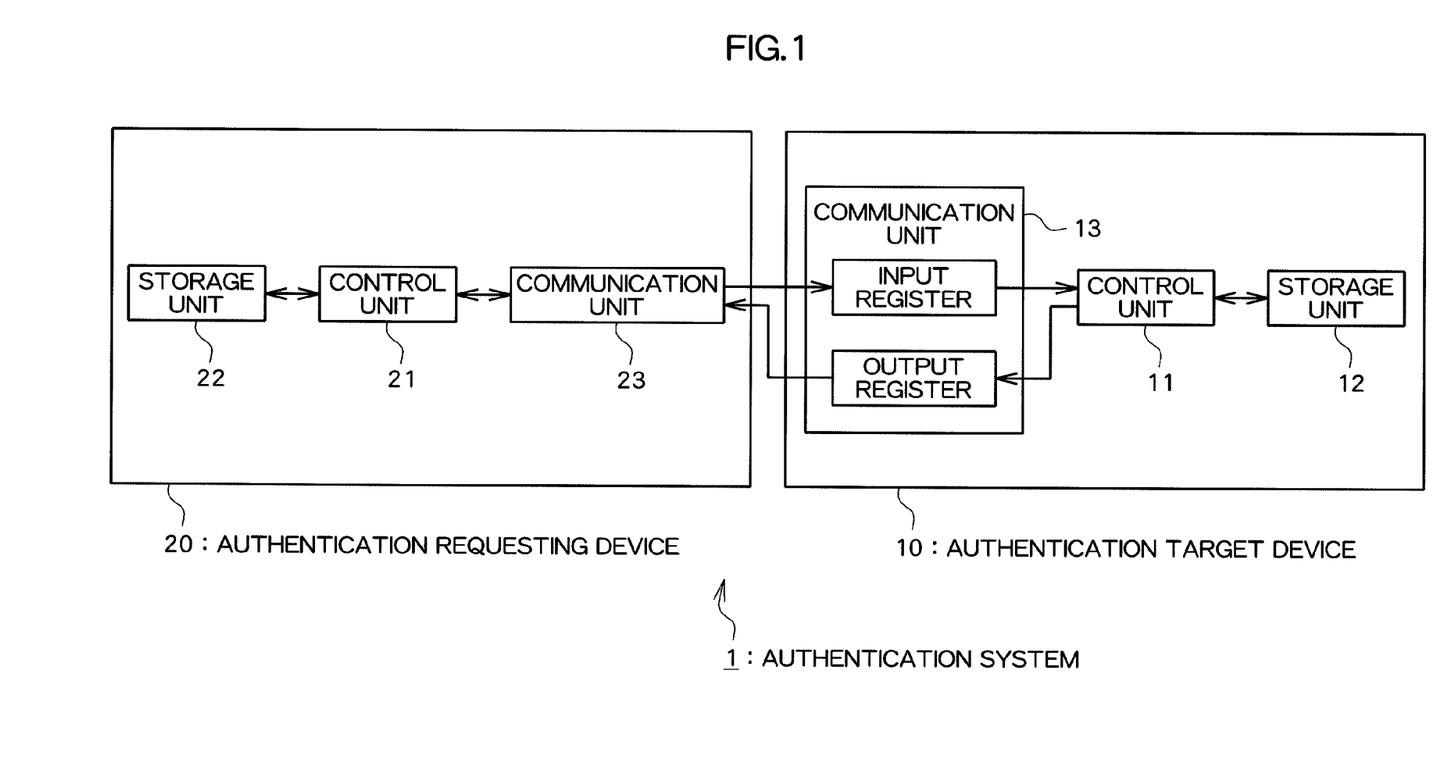
FIG. 1 is a block diagram schematically showing a structure of an authentication system according to an embodiment of the present invention.

In the following, an embodiment of the present invention will be described with reference to the accompanying drawings. As shown in FIG. 1, an authentication system 1 according to the embodiment of the present invention comprises an authentication target device 10 and an authentication requesting device 20.

The authentication target device 10 may be a device, such as a peripheral device, to be a target of an authentication process carried out by the authentication requesting device 20, and comprises a control unit 11, a storage unit 12, and a communication unit 13.

The control unit 11, which is a CPU or the like, operates according to a program stored in the storage unit 12. The control unit 11 carries out a process for realizing the function as an authentication target device. Specifically, the control unit 11 receives data from the authentication requesting device 20 and carries out various processes, such as encryption, decryption, and so forth, based on a control command contained in the received data. The process to be carried out by the control unit 11 in this embodiment will be described later in detail.

The storage unit 12 comprises a storage element, such as a flash ROM (Read Only Memory), a RAM (Random Access Memory), and so forth. The storage unit 12 stores a program to be carried out by the control unit 11 and data about an encryption key for use in an authentication process. The storage unit 12 also operates as a working memory for storing various data items necessary in a process carried out by the control unit 11.

The communication unit 13 comprises a serial communication port, for example, and is connected to the authentication requesting device 20. The communication unit 13 further comprises two registers, namely, an input register and an output register both for temporarily storing data. The communication unit 13 forwards the information which the controller unit 11 sends to the output register to the authentication requesting device 20. Further, the communication unit 13 writes the information received from the authentication requesting device 20 into the input register. The information written in the input register is read by the control unit 11.

The authentication requesting device 20 is a device, such as a main body of an electrical appliance, which carries out an authentication process for the authentication target device 10, and comprises a control unit 21, a storage unit 22, and a communication unit 23.

The control unit 21 is a CPU or the like, and operates according to a program stored in the storage unit 22. The control unit 21 carries out a process for realizing a function as an authentication requesting device. Specifically, the control unit 21 produces an authentication code, then encrypts the produced authentication code to thereby produce an encrypted code, and outputs the produced encrypted code to the authentication target device 10. Further, the control unit 21 receives data from the authentication target device 10 to thereby obtain an encrypted code, then decrypts the obtained encrypted code, and verifies the resultant data to thereby carry out an authentication process to authenticate the authentication target device 10. An authentication process to be carried out by the control unit 21 in this embodiment will be described later in detail.

The storage unit 22 comprises at least either one of the storage element, such as a flash ROM (Read Only Memory), a RAM (Random Access Memory), and so forth, and a disk device, such as a hard disk drive and so forth. The storage unit 22 stores a program to be carried out by the control unit 21 and data about an encryption key for use in an authentication process. The storage unit 22 also operates as a working memory for storing various data items necessary in a process carried out by the control unit 21.

The communication unit 23 is a serial communication port, for example, and is connected to the communication unit 13 of the authentication target device 10. The communication unit 23 sends information to the authentication target device 10 according to an instruction from the control unit 21, and forwards information received from the authentication target device 10 to the control unit 21.

In the following, a function realized by the control unit 11 of the authentication target device 10 will be described. It should be noted that the storage unit 12 of the authentication target device 10 has a plurality of encryption keys k0, k1, and so forth stored therein in advance in this embodiment, in which the encryption keys have corresponding key numbers in order for identification, namely, 0, 1, and so forth.

Figure 2:
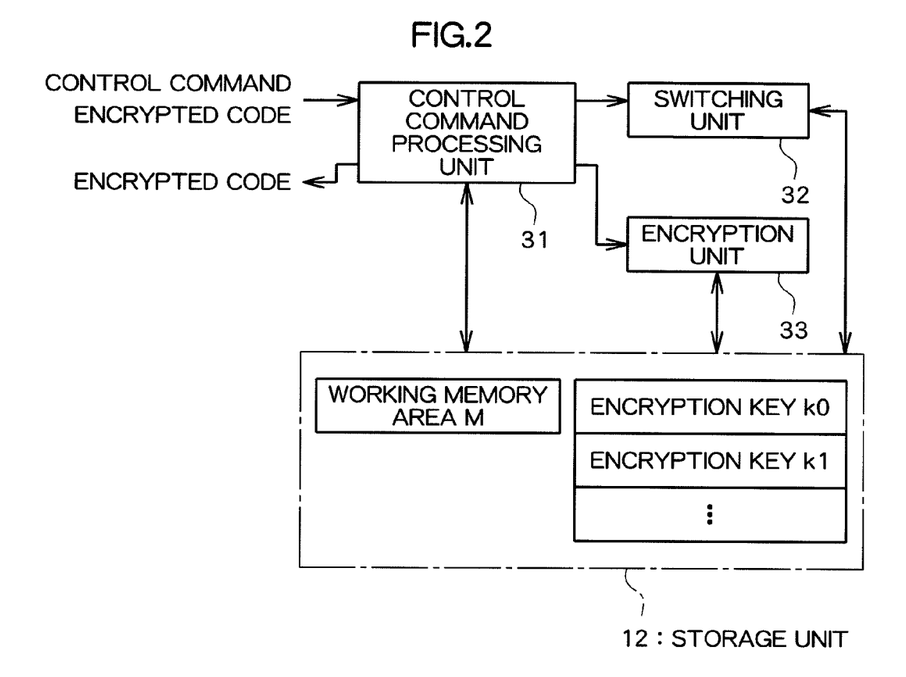
FIG. 2 is a functional block diagram showing one example of a function of an authentication target device 10.

As shown as an example in FIG. 2, the control unit 11 comprises, in terms of function, a control command processing unit 31, a switching unit 32, and an encryption unit 33.

The control command processing unit 31 reads, from the input register, a control command which contains various control information items about an authentication process and is received by the communication unit 13 from the authentication requesting device 20.

The control information items contained in the control command may include the following, for example:
(1) switching instruction information which instructs whether or not to carry out a switching process for an encryption key and an authentication code, respectively;
(2) encryption instruction information which instructs whether either encryption or decryption is carried out or whether neither is carried out;
(3) input location specifying information which specifies a place from which process target data is read;
(4) output destination specifying information which specifies a place into which a result of a predetermined process carried out for target data is written;
(5) encryption key specifying information which specifies an encryption key for use in encryption or decryption; and
(6) switching target portion specifying information which specifies a portion to be switched, or a switching target portion, in data designated by the switching instruction information as a switching target among an encryption key and an authentication code.

Having read the control command, the control command processing unit 31 carries out various processes based on the control information contained in the read control command. Specifically, the control command processing unit 31 specifies a place from which process target data is read (a read location), with reference to the input location specifying information. A read location may include the input register of the communication unit 13 and a predetermined working memory area in the storage unit 12. With the input register specified as a read location, the control command processing unit 31 reads the target data having been sent from the authentication requesting device 20 from the input register of the communication unit 13.

Subsequently, the control command processing unit 31 causes the switching unit 32 to switch the switching target portions in the target data and/or an encryption key, and the encryption unit 33 to encrypt or decrypt the target data, in a predetermined order, according to the switching instruction information and the encryption instruction information.

Specifically, when the contained encryption instruction information instructs encryption, the control unit 11 initially carries out a switching process for the target data and the encryption key specified by the encryption key specifying information according to the switching instruction information, and then encrypts the target data. Meanwhile, when the contained encryption instruction information instructs decryption, the control unit 11 carries out a switching process for the encryption key specified by the encryption key specifying information according to the switching instruction information, then decrypts the target data, and again carries out a switching process for the restored target data according to the switching instruction information.

Further, the control command processing unit 31 writes, as output data, the data obtained through the switching, encryption, decryption, and so forth, carried out with respect to the target data into the write location specified by the output destination specifying information. A write location, or a place into which data is written, may include the output register of the communication unit 13 and a predetermined working memory area in the storage unit 12. The data written in the output register is sent by the communication unit 13 to the authentication requesting device 20.

The switching unit 32 switches the switching target portions in the target data and/or an encryption key according to the control information contained in the control command obtained by the control command processing unit 31. The kind (target data or an encryption key) of the switching target data is designated by the switching instruction information contained in the control command. Specifically, when an encryption key is designated as a switching target, the encryption key, among those held in the storage unit 12, specified by the encryption key specifying information contained in the control command is to be subjected to switching.

Further, the switching unit 32 specifies the switching target portion in the switching target data, referring to the switching target portion specifying information contained in the control command. Specifically, as the switching target portion specifying information contains, for example, two numeric values which designate two portions in the switching target data, the switching unit 32 switches the two portions specified by the switching target portion specifying information. For example, suppose that the switching target data is of 128 bits, and that a block obtained by dividing the switching target data into sixteen blocks each having eight bits is used as a switching unit. In this case, the switching target portion specifying information contains two different numeric values between 0 and 15, and the switching unit 32 designates, as switching target portions, two blocks specified by the respective numeric values. As one example, supposing that the switching target portion specifying information contains numeric values three and five, the switching unit 32 switches the third and fifth blocks, counted from 0, of the sixteen blocks of the switching target data.

Alternatively, the switching target portion specifying information may contain one numeric value which designates one portion in the switching target data. In this case, the switching unit 32 specifies, as switching target portions, the portion (a designated portion) designated by the switching target portion specifying information and another portion (a corresponding portion) determined corresponding to the designated portion, and switches the two portions. Specifically, in the above described example of 128-bit switching target data comprising sixteen blocks, the switching target portion specifying information contains any one numeric value between 0 and 15, and the switching unit 32 determines a numeric value between 0 and 15 corresponding to the contained numeric value so that the portion designated by the determined numeric value is defined as a corresponding portion. As one example, supposing that the switching target portion specifying information contains a numeric value six (0110b), the switching unit 32 carries out four-bit bit reverse processing on the numeric value six, to thereby obtain a numeric value nine (1001b) The obtained value, namely, nine here, specifies a corresponding portion. Thus, the sixth block (a designated portion) and the ninth block (a corresponding portion), both counted from 0, are specified as switching target portions and switched. Such specification of two switching target portions based on the switching target portion specifying information which designates only one switching target portion, as described above, can reduce the amount of data to be contained in the switching target portion specifying information and thus the amount of data to be exchanged between the authentication target device 10 and the authentication requesting device 20.

It should be noted that when the target data stored in a predetermined working memory area is subjected to switching, the switching unit 32 may overwrite the working memory area with the target data subjected to switching (switched target data). When an encryption key stored in a memory region, such as a flash ROM and so forth, which is not adapted to overwriting, is subjected to switching, the encryption key subjected to switching (switched encryption key) is written into a predetermined working memory area.

The encryption unit 33 encrypts or decrypts target data according to the control information contained in the control command obtained by the control command processing unit 31. Any common key encryption algorithm, such as DES (Data Encryption Standard), AES (Advanced Encryption Standard), and so forth, is available as an encryption and decryption algorithm.

It should be noted that when the target data has been subjected to switching by the switching unit 32, the encryption unit 33 encrypts the switched target data. In encryption or decryption, the encryption unit 33 uses the encryption key, among those stored in the storage unit 12, which is specified by the encryption key specifying information contained in the control command. When the specified encryption key has been subjected to switching by the switching unit 32, the encryption unit 33 uses the switched encryption key in encryption or decryption.

In the following, a function realized by the control unit 21 of the authentication requesting device 20 will be described. It should be noted that the storage unit 22 of the authentication requesting device 20 in this embodiment stores the plural encryption keys k0, k1, and so forth that are the same as those held by the authentication target device 10.

Figure 3:
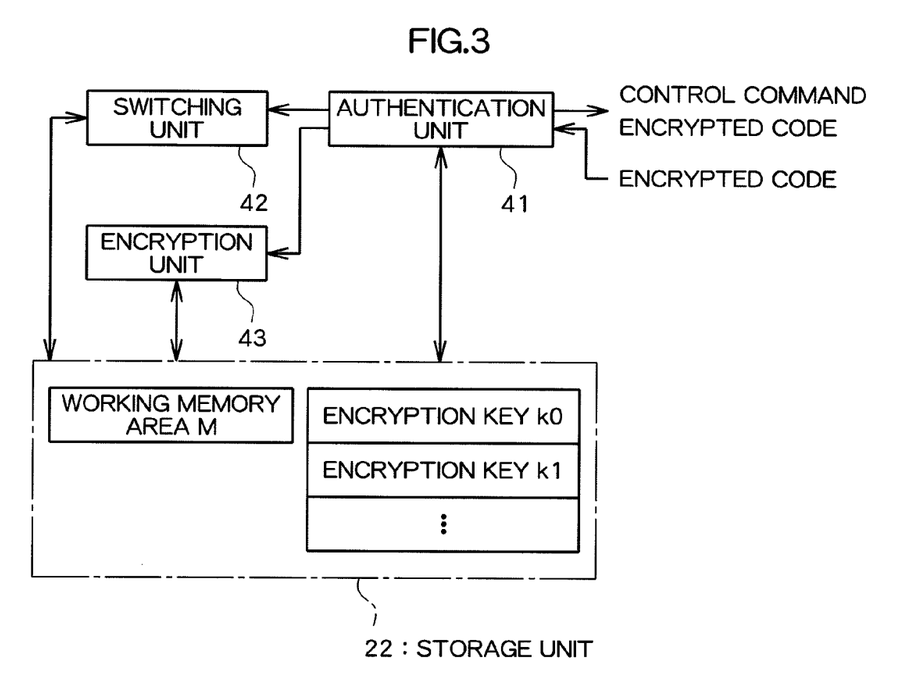
FIG. 3 is a functional block diagram showing one example of a function of an authentication requesting device 20.

As shown as an example in FIG. 3, the control unit 21 comprises, in terms of function, an authentication unit 41, a switching unit 42, and an encryption unit 43.

The authentication unit 41 carries out an authentication process at a predetermined time, such as when the authentication requesting device 20 is powered on, when the authentication target device 10 is connected to the authentication requesting device 20, when a predetermined period of time has passed after the last authentication process was carried out, and so forth.

As a specific example, the authentication unit 41 initially produces an authentication code for use in an authentication process. When a switching process is going to be carried out with respect to an encryption key and/or an authentication code, the authentication unit 41 produces switching target portion specifying information as a random number. Thereafter, the authentication unit 41 causes the switching unit 42 to carry out a switching process with respect to the target data, such as an authentication code and so forth and/or an encryption key, and the authentication unit 41 causes the encryption unit 42 to encrypt or decrypt the target data.

Then, the authentication unit 41 outputs a control command to the authentication target device 10 together with the encrypted authentication code, to thereby send the authentication code to the authentication target device 10. Also, by sending the control command to the authentication target device 10, the authentication unit 41 causes the authentication target device 10 to encrypt data such as the authentication code sent to the authentication target device 10 or a switched authentication code obtained by carrying out a switching process for the authentication code and to send the encrypted data to the authentication requesting device 20. The authentication unit 41 compares the data obtained by decrypting the received data with the data held in the authentication requesting device 20 to carry out an authentication process for the target device 10. Details of the process to be carried out by the authentication unit 41 will be described later.

In response to a request from the authentication unit 41, the switching unit 42 switches the switching target portions in the target data and/or the encryption key, similar to the switching unit 32 of the authentication target device 10. Also in response to a request from the authentication unit 41, the encryption unit 43 encrypts or decrypts the target data, using the same encryption algorithm as that used by the encryption unit 33 of the authentication target device 10.

In the following, some examples of an authentication process to be carried out with respect to the authentication target device 10 in cooperation with the above described units will be described.

Figure 4:
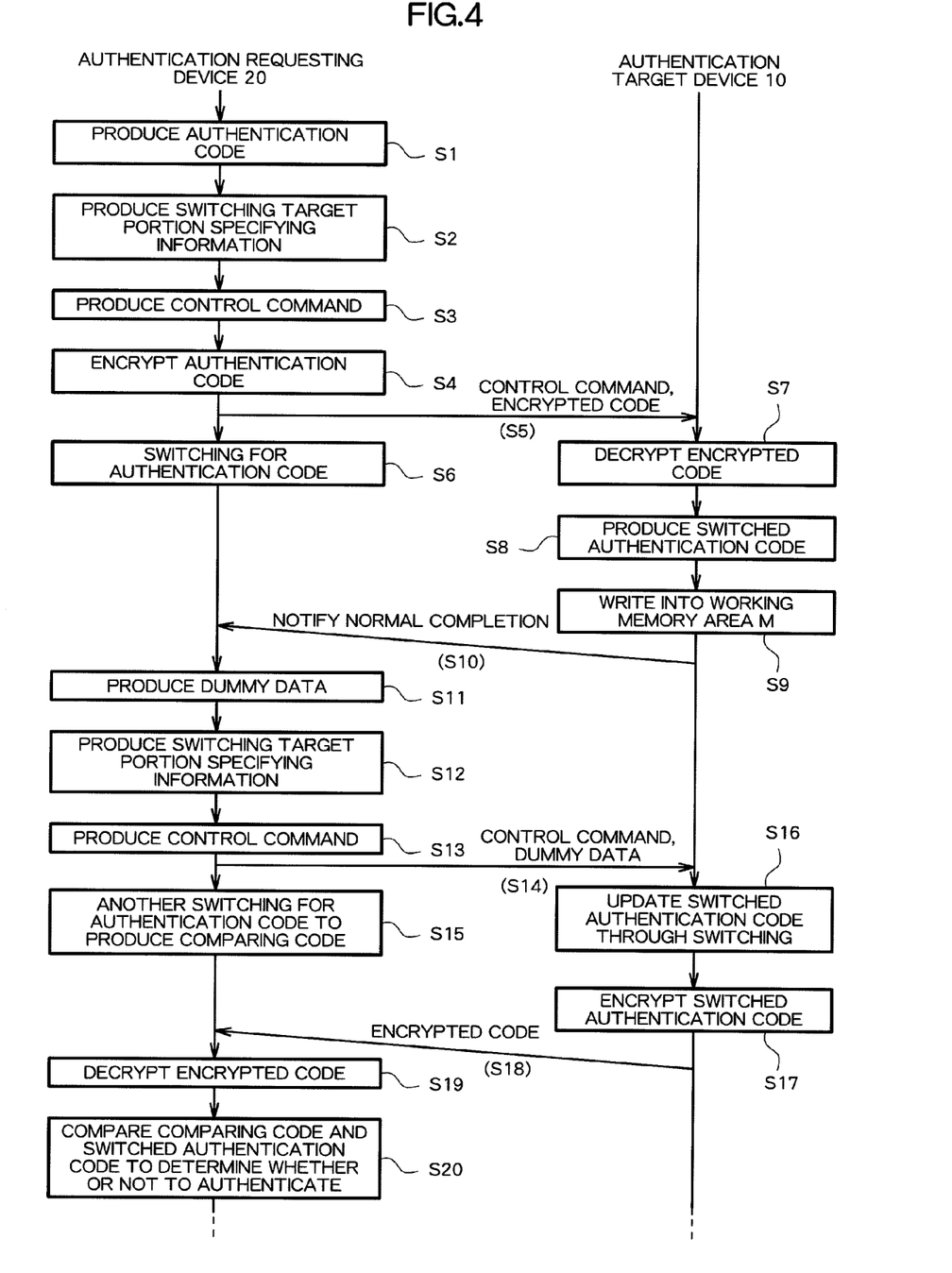
FIG. 4 is a flowchart of one example of an authentication process to be carried out by the embodiment of the present invention.

Initially, an example of an authentication process involving a switching process carried out with respect to an authentication code will be described, based on the flowchart of FIG. 4.

That is, the authentication unit 41 of the authentication requesting device 20 initially produces an authentication code R (S1). Assume here as a specific example that the authentication code R is a 128-bit random value, with an example thereof being a value 0x00112233445566778899AABBCCDDEEFF.

The authentication unit 41 then produces switching target portion specifying information for use in a switching process carried out for the authentication code R (S2). Assume here as a specific example that the switching target portion specifying information is a value which designates, as a switching target portion, one of the sixteen blocks, each being eight bits, into which the 128-bit authentication code is divided, and specifically is any randomly determined number between 0 and 15. In the following, a case with the target portion specifying information indicating 0x06 will be described as an example.

Subsequently, the authentication unit 41 produces a control command for the authentication target device 10 (S3). Assume here that a control command which contains the control information items described below is produced by the authentication unit 41:

(1) switching instruction information which instructs switching for an authentication code alone;
(2) encryption instruction information which instructs decryption;
(3) input location specifying information which specifies an input register;
(4) output destination specifying information which specifies a predetermined working memory area M;
(5) encryption key specifying information which describes the key number 0 of the encryption key k0; and
(6) switching target portion specifying information for an authentication code which indicates "0x06".

In response to a request from the authentication unit 41, the encryption unit 43 encrypts the authentication code R, using the encryption key k0, to thereby produce an encrypted code (S4). In the above, when encrypting the target data d, using the encryption key k, is denoted as ENC (d, k), the encrypted code produced in the process at S4 can be denoted as ENC(R, k0).

Subsequently, the authentication unit 41 outputs the control command produced in the process at S3 and the encrypted code ENC(R, k0), produced by the encryption unit 43 in the process at S4, via the communication unit 23 to the authentication target device 10 (S5).

Further, after the transmission in the process at S5, in response to a request from the authentication unit 41, the switching unit 42 carries out a switching process for the authentication code R (S6). In the above, as the switching target portion specifying information is "0x06", another switching target portion (a corresponding portion), or a portion corresponding to the portion designated by the switching target portion specifying information "0x06", is determined as the portion designated by "0x09", for example, through a four-bit bit reverse process. In the above, when the data obtained by switching the switching target portions specified by the switching target portion specifying information s in the target data d is denoted as SHF (d, s), the switched authentication code can be denoted as SHF (R, 0x06). The value of SHF (R, 0x06) is 0x00112233445599778866AABBCCDDEEFF here.

Meanwhile, in the authentication target device 10, the control command processing unit 31 reads the control command and the encrypted code ENC (R, k0), both sent from the authentication requesting device 20 in the process at S5, from the input register of the communication unit 13.

When the encryption instruction information contained in the control command sent from the authentication requesting device 20 instructs decryption, the authentication target device 10 carries out decryption before a switching process for the authentication code. That is, in response to a request from the control command processing unit 31, the encryption unit 33 decrypts the encrypted code, to thereby restore the authentication code (S7). In the above, the decryption target data is the encrypted code ENC(R, k0), read from the input register specified by the input location specifying information. In the decryption, the encryption unit 33 uses the encryption key k0 specified by the encryption key specifying information. After the above described processes, the authentication code R, or the authentication code before encryption, is available.

Subsequently, in response to a request from the control command processing unit 31, the switching unit 32 carries out a switching process for the authentication code R, restored in the process at S7, to thereby produce a switched authentication code (S8). As the switching target portion specifying information is "0x06" in the above, the switching unit 32 switches the sixth block and the ninth block, both counted from 0, of the sixteen blocks, similar to the switching unit 42 of the authentication requesting device 20. With the above, a switched authentication code SHF (R, 0x06), identical to the data obtained in the process at S6, can be obtained.

Then, the control command processing unit 31 writes the switched authentication code SHF (R, 0x06), obtained in the above described series of processes, into the working memory area M specified by the output destination specifying information (S9). Thereupon, the authentication target device 10 completes the process in connection with the control command received in the process at S5, and outputs a normal completion note to the authentication requesting device 20 (S10).

In the authentication requesting device 20, upon receipt of the normal completion note in the process at S10, the authentication unit 41 carries out the following process.

That is, the authentication unit 41 initially produces a 128-bit random value q (S11). The random value q is used as dummy data, and is thus not indispensable in the authentication process.

Then, the authentication unit 41 produces new switching target portion specifying information, similar to the process at S2 (S12). In the following, a case with the switching target portion specifying information indicating 0x02 will be described as an example.

Further, the authentication unit 41 produces a new control command for the authentication target device 10 (S13). Assume here as an example that a control command which contains the control information items described below is produced.

(1) switching instruction information which instructs switching for an authentication code alone;
(2) encryption instruction information which instructs encryption;
(3) input location specifying information which specifies a working memory area M;
(4) output destination specifying information which specifies an output register;
(5) encryption key specifying information which describes the key number "1" of the encryption key k1; and
(6) switching target portion specifying information for an authentication code which indicates "0x02".

Here, the encryption unit 43 may encrypt the random value q produced in the process at s11 in response to a request from the authentication unit 41. With the random value q encrypted, the processes at S11 to S15, to be described later, will be identical to those at S1 to S6. This means that a part of the function carried out by the authentication unit 41 can be realized using a common program routine, though encryption of the random value q is not indispensable as the random value q is used merely as dummy data.

Thereafter, the authentication unit 41 outputs the control command produced in the process at S13 and the random value q, produced as dummy data in the process at S11 (or an encrypted random value q), via the communication unit 23 to the authentication target device 10 (S14). It should be noted that as the input location specifying information contained in the control command specifies a working memory area, rather than the input register, as a read location, the random value q (or an encrypted random value q) to be sent in the process at S14 is not used in the authentication target device 10. Nevertheless, transmission of dummy data together with the control command is useful even in such a case in order to prevent the process content from being readily guessed based on the communication content, and thus to enable an authentication process more resilient to communication interception.

Moreover, after the transmission in the process at S14, the switching unit 42 carries out another switching process for the switched authentication code SHF (R, 0x06), obtained in the process at S6, in response to a request from the authentication unit 41 (S15). In the above, as the switching target portion specifying information is "0x02", produced at S13, another switching target portion (a corresponding portion), or a portion corresponding to the portion designated by the switching target portion specifying information "0x02", is determined as the portion 0x0d through a four-bit bit reverse process. The switched authentication code (a comparing code), produced through the switching process and for use in comparison, is SHF (SHF(R, 0x06), 0x02). The value of SHF (SHF(R, 0x06), 0x02) is 0x011DD33445599778866AABBCC22EEFF here.

Meanwhile, in the authentication target device 10, the control command processing unit 31 reads the control command sent from the authentication requesting device 20 in the process at S14, from the input register of the communication unit 13.

When the encryption instruction information contained in the control command instructs encryption, the authentication target device 10 carries out a switching process before encryption. Specifically, the switching unit 32 initially carries out a switching process for the target data in response to a request from the control command processing unit 31, to thereby update the switched authentication code (S16). In the above, the switching target data is the switched authentication code SHF (R, 0x06) having been stored in the working memory M, or a read location specified by the input location specifying information, in the process at S10. As the switching target portion specifying information is "0x02" here, the updated switched authentication code SHF (SHF(R, 0x06), 0x02) is obtained, similar to the result in the process at S15.

Subsequently, the encryption unit 33 encrypts the switched authentication code obtained in the process at S16, in response to a request from of the control command processing unit 31, to thereby produce a new encrypted code (S17). In the encryption, the encryption unit 33 uses the encryption key k1 specified by the encryption key specifying information. With the above, an encrypted code ENC (SHF(SHF(R, 0x06), 0x02, k1) is obtained.

Then, the control command processing unit 31 writes the encrypted code obtained in these series of processes into the output register, or a write location specified by the output destination specifying information (S18). Accordingly, the encrypted code ENC(SHF(SHF(R, 0x06), 0x02), k1) is sent to the authentication requesting device 20.

Having received the encrypted code sent from the authentication target device 10, the authentication requesting device 20 determines whether or not to ultimately authenticate the authentication target device 10 as follows. That is, initially, in response to a request from the authentication unit 41, the encryption unit 43 decrypts the encrypted code received in the process at S18, using the encryption key k1 (S19). With the above, the switched authentication code SHF(SHF(R, 0x06), 0x02) is obtained.

Then, the authentication unit 41 compares the switched authentication code restored in the process at S19 with the comparing code obtained in the process at S15 to determine whether or not to authenticate the authentication target device 10 (S20).

That is, the two codes to be compared in the process at S20 should be both SHF(SHF(R, 0x06), 0x02), or identical to each other, if the authentication target device 10 has duly carried out the switching process and encryption and decryption, using the encryption key common to that used in the authentication requesting device 20. In this case, successful authentication is determined, and the authentication requesting device 20 carries out a process to, for example, validate the function of the authentication target device 10, and so forth. On the other hand, when the switched authentication code obtained from the authentication target device 10 does not coincide with the comparing code produced in the authentication requesting device 20, authentication failure is determined. Then, based on the determination result, the authentication requesting device 20 carries out a process to, for example, invalidate at least a part of the function of the authentication target device 10.

It should be noted that the switching instruction information which instructs switching for an authentication code is contained in the two control commands produced in the processes at S3 and S13 in the above described process so that a switching process is carried out twice in total with respect to the authentication code by the switching units 32 and 42, respectively. However, the switching may be made only once. In this case, switching instruction information which instructs application of no switching is contained in one of the two control commands. Accordingly, a transmission of an encrypted code without involving a switching process can be realized.

Alternatively, the switching may be made three or more times by the switching units 32 and 42. In this case, the authentication unit 41 may carry out the process to be described below between the processes at S10 and S11. That is, the authentication unit 41 sends a control command which contains encryption instruction information which instructs neither encryption nor decryption and switching instruction information which instructs switching for an authentication code to the authentication target device 10. Having received this control command, the authentication target device 10 simply carries out a switching process for the switched authentication code held by itself, and carries out neither encryption nor decryption. Meanwhile, the authentication requesting device 20 also carries out a similar switching process for the switched authentication code held by itself. Application of the above-described process at a predetermined number of times results in updating the authentication code, through switching processes carried out multiple times for the authentication code for use in an authentication process, to one which is different from the initial authentication code used in producing the encrypted code for the first transmission.

When the authentication unit 41 carries out extra authentication process after the above described authentication process, the switched authentication code obtained by carrying out a switching process multiple times for the initial authentication code R and used in comparison in the process at S20 may be used in the process at S1, rather than producing an authentication code which is a random value. With the above, it is possible to carry out an authentication process, using an authentication code different from the one used in the initial authentication process, without producing a random value. According to this method, an authentication code becomes different from the one having the initial value through a switching process every time an authentication process is carried out. This makes analysis on the details about the authentication process more difficult to be attained should the series of transmission data in multiple authentication processes be intercepted.

Figure 5:
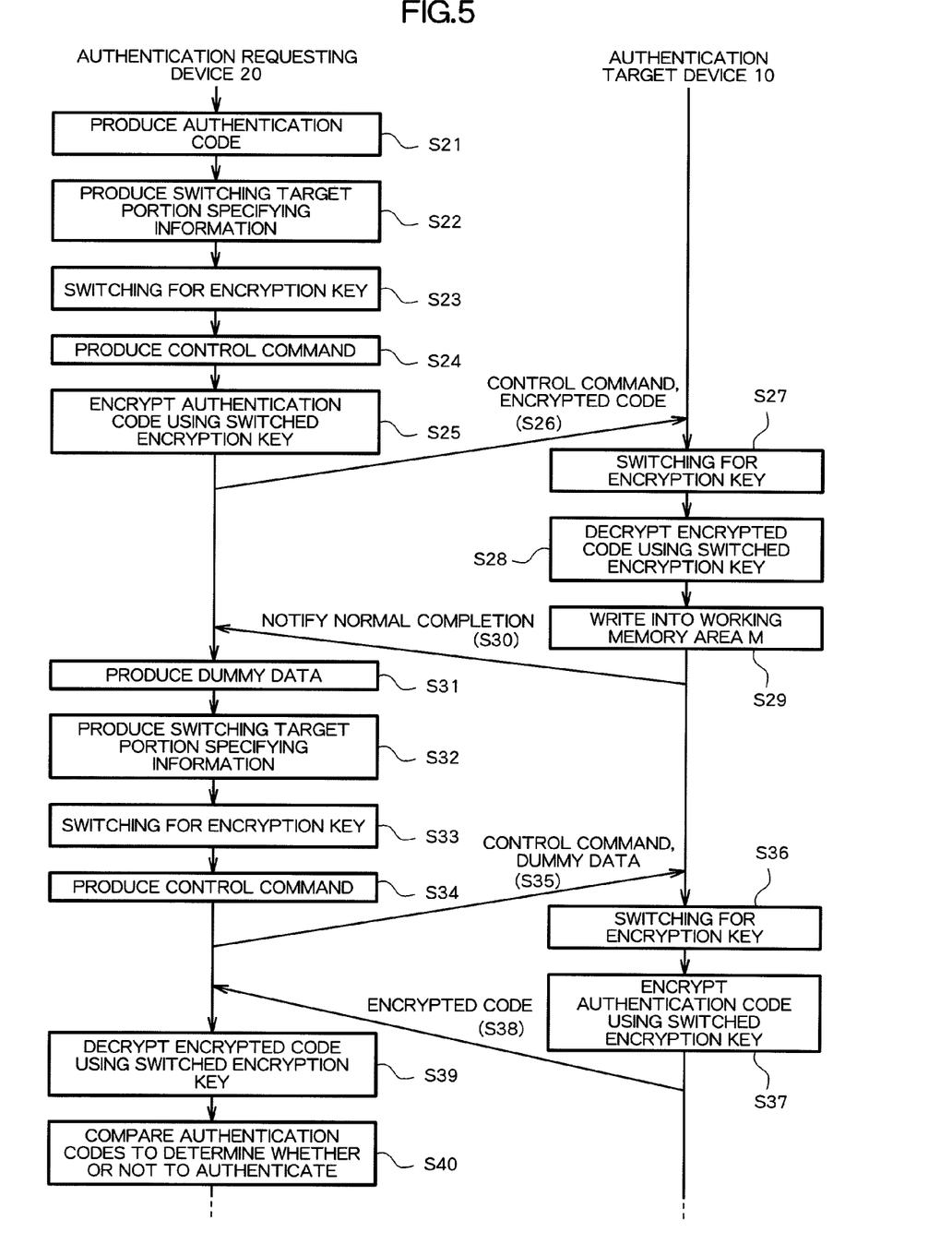
FIG. 5 is a flowchart of another example of an authentication process to be carried out by the embodiment of the present invention.

In the following, an example of an authentication process involving switching for an encryption key will be described based on the flowchart of FIG. 5.

Initially, the authentication unit 41 of the authentication requesting device 20 produces an authentication code R (S21). Assume here that the authentication code R is a 128-bit random value, similar to the above described example.

Thereafter, the authentication unit 41 produces switching target portion specifying information to be referred to in a switching process for an encryption key (S22). Similar to the case with an authentication code, the switching target portion specifying information is a value which designates, as a switching target portion, one of the sixteen blocks, each being eight bits, into which a 128-bit encryption key is divided, and specifically is any randomly determined numeric value between 0 and 15. In the following, an example with the target portion specifying information indicating 0x00 will be described.

Subsequently, in response to a request from the authentication unit 41, the switching unit 42 carries out a switching process for an encryption key, referring to the switching target portion specifying information produced in the process at S22 (S23). In the above, an encryption key k0 is used as a switching target encryption key. With the above, the switching unit 42 produces an encryption key subjected to switching (switched encryption key) SHF(k0, 0x00).

Further, the authentication unit 41 produces a control command for the authentication target device 10 (S24). Assume here as a specific example that a control command which contains the following control information items is produced.

(1) switching instruction information which instructs switching for an encryption key alone;
(2) encryption instruction information which instructs decryption;
(3) input location specifying information which specifies an input register;
(4) output destination specifying information which specifies a working memory area M;
(5) encryption key specifying information which describes the key number "0" of the encryption key k0; and
(6) switching target portion specifying information for an encryption key which indicates "0x00".

Thereafter, in response to a request from the authentication unit 41, the encryption unit 43 encrypts the authentication code R, using the switched encryption key SHF(k0, 0x00) produced in the process at S23, to thereby produce an encrypted code (S25). Consequently, an encrypted code ENC (R,SHF(k0, 0x00)) is produced.

Further, the authentication unit 41 outputs the control command produced in the process at S24 and the encrypted code ENC(R,SHF(k0, 0x00)) produced by the encryption unit 43 in the process at S25 via the communication unit 23 to the authentication target device 10 (S26).

In the authentication target device 10, the control command processing unit 31 reads the control command and the encrypted code ENC(R,SHF(k0, 0x00)), sent from the authentication requesting device 20 in the process at S26, from the input register of the communication unit 13.

When the switching instruction information contained in the control command sent from the authentication requesting device 20 instructs switching for an encryption key, the authentication target device 10 carries out a switching process for the encryption key before encryption or decryption. Specifically, the switching unit 32 carries out a switching process for the encryption key in response to a request from the control command processing unit 31, to thereby produce a switched encryption key (S27). In the above, the switching target data is the encryption key k0 specified by the encryption key specifying information contained in the control command. With the above, the switching unit 32 produces a switched encryption key SHF(k0, 0x00), identical to that produced by the authentication requesting device 20 in the process at S23.

Then, the encryption unit 33 decrypts the encrypted code in response to a request from the control command processing unit 31, to thereby restore the authentication code (S28). In the above, the decryption target data is the encrypted code ENC(R,SHF(k0, 0x00)), read from the input register specified by the input location specifying information. In the decryption, the encryption unit 33 uses the switched encryption key (k0, 0x00), produced in the process at S27. With the above, the authentication code R before encryption can be obtained.

The control command processing unit 31 writes the authentication code R obtained in the above-described series of processes into the working memory area M specified by the output destination specifying information (S29). Thereupon, the authentication target device 10 completes the process in connection with the control command received in the process at S26, and outputs a normal completion note to the authentication requesting device 20 (S30).

In the authentication requesting device 20, upon receipt of the normal completion note at S30, the authentication unit 41 carries out the following process.

That is, the authentication unit 41 initially produces a 128-bit random value q (S31), which is dummy data, similar to the above-described example of an authentication process involving switching for an authentication code.

Then, the authentication unit 41 produces a new switching target portion specifying information (S32). In the following, a case with the switching target portion specifying information indicating 0x05 will be described as an example.

Then, in response to a request from the authentication unit 41, the switching unit 42 carries out a switching process for an encryption key, referring to the switching target portion specifying information produced in the process at S32 (S33). In the above, the switching target encryption key is the encryption key k1. Consequently, the switching unit 42 produces a switched encryption key SHF(k1, 0x05).

Further, the authentication unit 41 produces a new control command for the authentication target device 10 (S34). Assume here as an example that a control command which contains the control information items to be described below is produced:
(1) switching instruction information which instructs switching for an encryption key alone;
(2) encryption instruction information which instructs encryption;
(3) input location specifying information which specifies a working memory area M;
(4) output destination specifying information which specifies an output register;
(5) encryption key specifying information which describes the key number "1" of the encryption key k1; and
(6) switching target portion specifying information for an encryption key which indicates "0x05".

Similar to the above described example of an authentication process involving switching for an authentication code, the encryption unit 43 may encrypt the random value q produced in the process at S31. Thereafter, the authentication unit 41 outputs the control command produced in the process at S34 and the random value q produced as dummy data in the process at S31 (or an encrypted random value q) via the communication unit 23 to the authentication target device 10 (S35).

In the authentication target device 10, the control command processing unit 31 reads the control command received from the authentication requesting device 20 in the process at S35 from the input register of the communication unit 13.

As the switching instruction information contained in the control command instructs switching for an encryption key, the authentication target device 10 carries out a switching process before encryption, similar to the process at S27. Specifically, the switching unit 32 initially carries out a switching process for the encryption key in response to a request from the control command processing unit 31, to thereby produce a switched encryption key (S36). In the above, the switching target encryption key is the encryption key k1 specified by the encryption key specifying information. As the switching target portion specifying information indicates 0x05, the switching unit 32 produces a switched encryption key SHF (k1, 0x05), similar to the result obtained in the process at S33.

Subsequently, in response to a request from the control command processing unit 31, the encryption unit 33 encrypts the target data, to thereby produce an encrypted code (S37). In the above, the encryption target data is the authentication code R stored in the working memory area M, or the read location specified by the input location specifying information, in the process at S29. In the encryption, the encryption unit 33 uses the switched encryption key SHF(k1, 0x05), produced in the process at S36. With the above, an encrypted code ENC(R,SHF(k1, 0x05)) is obtained.

The control command processing unit 31 writes the encrypted code obtained in the above-described series of processes into the output register, or the write location specified by the output destination specifying information (S38). With the above, the encrypted code ENC(R, SHF(k1, 0x05)) is sent to the authentication requesting device 20.

Having received the encrypted code sent from the authentication target device 10, the authentication requesting device 20 determines whether or not to ultimately authenticate the authentication target device 10, to be described below. Initially, in response to a request from the authentication unit 41, the encryption unit 43 decrypts the encrypted code received in the process at S38 (S39). In the decryption, the encryption unit 43 uses the switched encryption key SHF(k1, 0x05), produced in the process at S33. With the above, the authentication code R is obtained.

Then, the authentication unit 41 compares the authentication code restored in the process at S39 with the authentication code R produced in the process at S21 to determine whether or not to authenticate the authentication target device 10 (S40). The two codes for comparison in the process at S40 should be both R, or identical to each other, if the authentication target device 10 has duly carried out the process. In this case, successful authentication is determined. On the other hand, the authentication code obtained from the authentication target device 10 does not coincide with the authentication code produced in the authentication requesting device 20, authentication failure is determined.

It should be noted that although it is described in the above that switching instruction information which instructs switching for an encryption key is contained in the two control commands produced in the processes at S24 and S32 so that a switching process is carried out twice, a switching process may be carried out only once. Alternatively, the switching units 32 and 42 may carry out a switching process for the encryption keys three or more times. In this case, the authentication requesting device 20 outputs a control command which contains encryption instruction information which instructs application of neither encryption nor decryption and switching instruction information which instructs switching for an encryption key to the authentication target device 10, similar to the above described authentication process involving switching for an authentication code, and carries out a similar switching process for the encryption key held by itself. By applying the above described process a predetermined number of times, it is possible to carry out an encryption and decryption process, using an encryption key changing to be further different from the one initially held.

When the authentication unit 41 carries out extra authentication process after the above described authentication process, the authentication unit 41 may use a switched encryption key in carrying out the authentication process. In this case, the authentication requesting device 20 uses the switched encryption key produced in the processes at S23 and S33 in carrying out an authentication process, and the encryption key may be further subjected to switching in the extra authentication process. Also, the switched encryption key produced in the processes at S27 and S36 may be held in a predetermined working memory area, so that the authentication target device 10 may carry out encryption or decryption, using the encryption key held, in accordance with the control command from the authentication requesting device 20. With this arrangement, the encryption key is kept changing to be different from the initial encryption key through the switching process every application of an authentication process, which makes analysis on the encryption key more difficult to attain, compared to a case in which the same encryption key is repetitively used.

Alternatively, the authentication requesting device 20 may combine the above described switching for an authentication code and that for an encryption key. In this case, switching instruction information which instructs switching for an authentication code and an encryption key is contained in the control command produced by the authentication requesting device 20. With the above, encryption or decryption can be carried out using a switched encryption key, and the authentication code can be given switching during an authentication process. This arrangement makes analysis on the details about an authentication process more difficult to attain should the transmitting data be intercepted, and thus improves the security.

Figure 6:
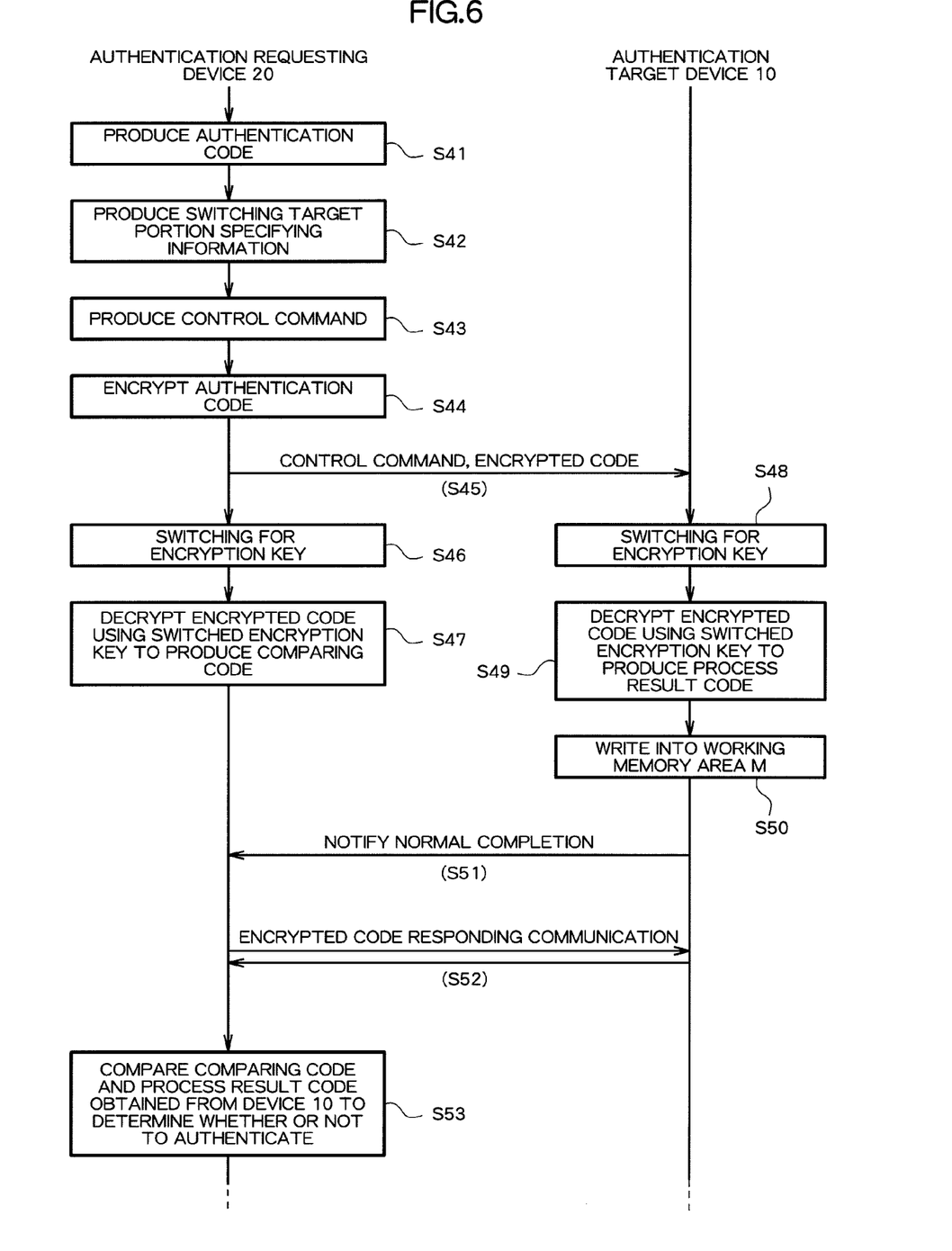
FIG. 6 is a flowchart of still another example of an authentication process to be carried out by the embodiment of the present invention.

In the following, another example of an authentication process involving switching for an encryption key will be described based on the flowchart of FIG. 6.

Initially, the authentication unit 41 of the authentication requesting device 20 produces an authentication code R (S41). Similar to the above described example, assume that the authentication code R is a 128-bit random value.

Then, the authentication unit 41 produces switching target portion specifying information to be referred to in carrying out a switching process for an encryption key (S42). Similar to the above described example, the switching target portion specifying information is a value which designates, as a switching target portion, one of the sixteen blocks, each being eight bits, into which a 128-bit encryption key is divided, and specifically is any randomly determined numeric value between 0 and 15. In the following, an example with the target portion specifying information indicating 0x07 will be described.

Further, the authentication unit 41 produces a control command for the authentication target device 10 (S43). Assume here as an example that a control command which contains the control information items to be described below is produced:

(1) switching instruction information which instructs switching for an encryption key alone;
(2) encryption instruction information which instructs decryption;
(3) input location specifying information which specifies an input register;
(4) output destination specifying information which specifies a working memory area M;
(5) encryption key specifying information which describes the key number "0" of the encryption key k0; and
(6) switching target portion specifying information for an encryption key which indicates "0x07".

Then, in response to a request from the authentication unit 41, the encryption unit 43 encrypts the authentication code R, using the encryption key k0, to thereby produce an encrypted code (S44). That is, an encrypted code ENC(R, k0) is produced.

Thereafter, the authentication unit 41 outputs the control command, produced in the process at S43, and the encrypted code ENC(R, k0), produced by the encryption unit 43 in the process at S44, via the communication unit 23 to the authentication target device 10 (S45).

Further, in response to a request from the authentication unit 41, the switching unit 42 carries out a switching process for the encryption key, referring to the switching target portion specifying information produced in the process at S42 (S46). Here, the switching target encryption key is the encryption key k0 specified by the encryption key specifying information contained in the control command produced in the process at S43. With the above, the switching unit 42 produces a switched encryption key SHF(k0, 0x07).

Then, in response to a request from the authentication unit 41, the encryption unit 43 decrypts the encrypted code ENC (R, k0), having sent to the authentication target device 10 in the process at S45 (S47). In the decryption, the switched encryption key SHF(k0, 0x07), produced in the process at S46, is used as an encryption key. In this embodiment, the encryption unit 43 employs a common key encrypting algorithm according to which a common encryption key is used for both encryption and decryption. Therefore, decrypting the encrypted code having been encrypted using the encryption key k0, using the switched encryption key SHF(k0, 0x07) cannot restore the original authentication code R, but produces only a 128-bit comparing code R'.

Meanwhile, in the authentication target device 10, the control command processing unit 31 reads the control command and the encrypted code ENC(R, k0), sent from the authentication requesting device 20 in the process at S45, from the input register of the communication unit 13

Here, similar to the above described first example of an authentication process involving switching for an encryption key, the switching unit 32 initially carries out a switching process for an encryption key in response to a request from the control command processing unit 31, to thereby produce a switched encryption key (S48). In the above, the switching target data is the encryption key k0 specified by the encryption key specifying information contained in the control command. With the above, the switching unit 32 produces a switched encryption key SHF(k0, 0x07), identical to that produced by the authentication requesting device 20 in the process at S46.

Thereafter, the encryption unit 33 decrypts the encrypted code in response to a request from the control command processing unit 31 (S49). In the above, the decryption target data is the encrypted code ENC(R, k0), read from the input register specified by the input location specifying information. The encryption unit 33 carries out decryption, using the switched encryption key SHF(k0, 0x07), produced in the process at S48, to thereby obtain a process result code R". Here again, as the encryption key k0 used in the encryption is not identical to the encryption key used in the decryption, the resultant process result code R" is different from the authentication code R originally used in the encryption, but identical to the comparing code R', produced by the authentication requesting device 20 in the process at S47.

Then, the control command processing unit 31 writes the process result code R", obtained in the above described series of processes, into the working memory area M specified by the output destination specifying information (S50). Thereupon, the authentication target device 10 completes the process in connection with the control command received in the process at S45, and outputs a normal completion note to the authentication requesting device 20 (S51).

Thereafter, the authentication requesting device 20 and the authentication target device 10 carry out encrypted code responding communication (S52). Specifically, in response to the control command sent by the authentication unit 41 to the authentication target device 10, the authentication target device 10 outputs an encrypted code obtained by encrypting the process result code R", having been written into the working memory area M in the process at S50 by the authentication target device 10, to the authentication requesting device 20, and the authentication requesting device 20 then decrypts the encrypted code received from the authentication target device 10, to thereby restore the process result code R". The encrypted code responding communication involving switching for an encryption key results in identical processes to those from S31 to S39 in the above described first example of an authentication process involving switching for an encryption key.

Thereafter, the authentication unit 41 of the authentication requesting device 20 compares the process result code R", restored in the process at S52, with the comparing code R', produced in the process at S47, to carry out an authentication process for the authentication target device 10 (S53). The comparison in the process at S53 would prove that the process result code R" is identical to the comparing code R' should the authentication target device 10 have duly carried out the process. In this case, successful authentication is determined. Meanwhile, when the process result code R", obtained by the authentication target device 10, is not identical to the comparing code R', produced in the authentication requesting device 20, authentication failure is determined.

According to the above described example of an authentication process, it seems that the authentication code R, or the data before encryption into the encrypted code to be sent by the authentication requesting device 20 to the authentication target device 10, has no relevance at all to, and is thus completely different from, the process result code R", or the data before encryption into the encrypted code to be sent by the authentication target device 10 to the authentication requesting device 20. Therefore, should the communication for the authentication process be intercepted, it is unlikely that the details of the authentication process would be readily analyzed. This can improve the security.

It should be noted that although it is described that the authentication requesting device 20 and the authentication target device 10 in the above described authentication system 1 hold a plurality of common encryption keys, the respective devices may have only one encryption key. In this case also, with application of switching for an encryption key, the encryption key for use in production of an encrypted code to be sent from the authentication requesting device 20 to the authentication target device 10 becomes different from that for use in production of an encrypted code to be sent from the authentication target device 10 to the authentication requesting device 20.

It should be noted that the authentication system 1 may use, as an encryption key for use in an authentication process, a session key produced by the authentication requesting device 20 as a random number, instead of the encryption key originally held. In this case, the authentication requesting device 20 encrypts the session key, using the originally held common encryption key, and then sends the encrypted session key to the authentication target device 10. In return, the authentication target device 10 decrypts the received data, using the encryption key originally held, to thereby restore the session key, and holds the restored session key in a predetermined working memory area. With the above, the authentication system 1 can thereafter carry out an authentication process, using the commonly held session key. In this case as well, in repetitive application of an authentication process, the authentication system 1 can carry out an authentication process, using a different encryption key each time, through a simpler process compared to a case in which a session key is made and distributed many times, by carrying out the authentication process while carrying out a switching process on the session key, for example.

It should be noted that although it is described in the above that the authentication requesting device 20 has a one-to-one relation with respect to the authentication target device 10, an embodiment of the present invention is not limited to the above. For example, the authentication requesting device 20 may be connected to a superior authentication requesting device. As one example, the authentication requesting device 20 may carry out an authentication process with respect to the authentication target device 10 in response to an instruction from the superior authentication requesting device, while the superior authentication requesting device carries out an authentication process with respect to the authentication requesting device 20 similarly. In this case, the authentication requesting device 20 functions as an authentication target device according to the embodiment of the present invention, for the superior authentication requesting device. Further, should an encryption key used between the authentication requesting device 20 and the authentication target device 10 be leaked to the outside, the superior authentication requesting device may encrypt and distribute a new encryption key for use in a subsequent authentication process. With the above, even if a part of the encryption key should be leaked to the outside, an authentication process can be continued with the same security level maintained, using the newly distributed encryption key.

It should be noted that the superior authentication requesting device may carry out an authentication process for the authentication target device 10 via the authentication requesting device 20, as well as for the authentication requesting device 20. In this case, the authentication requesting device 20 functions as a relay device which relays a control command and an encrypted code sent from the superior authentication target device to the authentication target device 10, and an encrypted code sent from the authentication target device 10 to the superior authentication target device.

According to the above described embodiment, application of a switching process for an authentication code and/or an encryption key enables use of different encryption target data and a different encryption key in each transmission. With the above, it is possible to send a different encrypted code each time even when only a few encryption keys are held. This makes analysis on the details about an authentication process difficult to attain, and the security can be improved.

The invention claimed is:

1. An authentication system having an authentication target device having a processor and an authentication requesting device having a processor for carrying out an authentication process for the authentication target device, in which the authentication target device and the authentication requesting device respectively hold at least one common encryption key, wherein the authentication requesting device comprises:
a first encrypted code production unit that encrypts an authentication code, using the encryption key, to thereby produce a first encrypted code, wherein the authentication code is divided into a plurality of portions having an assigned numeric value;
a switching target portion selecting unit that selects at least one pair of the assigned numeric values of the authentication code as switching target portions;
a transmission unit that sends the first encrypted code and switching target portion specifying information which specifies the switching target portions to the authentication target device; and
a switching unit that switches the switching target portions of the authentication code using the switching target portion specifying information, to thereby produce a comparing code, and the authentication target device comprises:
an authentication code decrypting unit that decrypts the first encrypted code sent, using the encryption key, to thereby restore the authentication code;
a switching unit that switches the switching target portions of the restored authentication code, based on the switching target portion specifying information sent, to thereby produce a switched authentication code;
a second encrypted code production unit that encrypts the switched authentication code, using the encryption key, to thereby produce a second encrypted code; and
a transmission unit that sends the second encrypted code to the authentication requesting device, and
the authentication requesting device decrypts the second encrypted code sent, using the encryption key, to thereby restore the switched authentication code, and compares the restored switched authentication code with the comparing code to carry out an authentication process for the authentication target device.

2. An authentication target device having a processor holding at least one encryption key common to an encryption key held by an authentication requesting device, to be a target of an authentication process carried out by the authentication requesting device, comprising:
a first encrypted code receiving unit that receives a first encrypted code obtained by encrypting an authentication code, using the encryption key, from the authentication requesting device, wherein the authentication code is divided into a plurality of portions having an assigned numeric value;
a switching target portion receiving unit that receives switching target portion specifying information specifying at least one pair of the assigned numeric values in the authentication code as switching target portions, from the authentication requesting device;
an authentication code decrypting unit that decrypts the first encrypted code received, using the encryption key, to thereby restore the authentication code;
a switching unit that switches the switching target portions in the authentication code restored, based on the switching target portion specifying information received, to thereby produce a switched authentication code;
a second encrypted code producing unit that encrypts the switched authentication code, using the encryption key, to thereby produce a second encrypted code; and
a second encrypted code transmission unit that sends the second encrypted code to the authentication requesting device,
wherein the second encrypted code is used in an authentication process to be carried out by the authentication requesting device wherein
the authentication requesting device decrypts the second encrypted code sent, using the encryption key, to thereby restore the switched authentication code, and compares the restored switched authentication code with a comparing code to carry out the authentication process for the authentication target device.

3. An authentication target device having a processor holding at least one encryption key common to an encryption key held by an authentication requesting device, the encryption key being divided into a plurality of portions having assigned numeric values, to be a target of an authentication process carried out by the authentication requesting device, comprising:
a switching target portion receiving unit that receives switching target portion specifying information specifying at least one pair of the assigned numeric values of the common encryption key, as switching target portions, from the authentication requesting device;

a first encrypted code receiving unit that receives a first encrypted code obtained by encrypting an authentication code, using an encryption key obtained by switching the switching target portions of the common encryption key, from the authentication requesting device;

a switching unit that switches the switching target portions in the common encryption key, based on the switching target portion specifying information received, to thereby produce a switched encryption key;

an authentication code decrypting unit that decrypts the first encrypted code received, using the switched encryption key, to thereby restore the authentication code;

a second encrypted code producing unit that encrypts the authentication code restored, using the switched encryption key, to thereby produce a second encrypted code; and a second encrypted code transmission unit that sends the second encrypted code to the authentication requesting device wherein the second encrypted code is used in an authentication process to be carried out by the authentication requesting device, wherein the authentication requesting device decrypts the second encrypted code sent, using the switched encryption key, to thereby restore the authentication code, and compares the restored authentication code with a comparing code to carry out the authentication process for the authentication target device.

* * * * *